United States Patent [19]

Katayama et al.

[11] Patent Number: 5,212,574
[45] Date of Patent: May 18, 1993

[54] ACTIVE MATRIX BOARD HAVING DOUBLE-LAYER SCAN LINES AND CAPACITY LINES WITH DISCONTINUOUS LOWER SCAN LINES AND LOWER CAPACITY LINES

[75] Inventors: Mikio Katayama; Hidenori Negoto, both of Ikoma; Hiroaki Kato; Akihiko Imaya, both of Nara; Yuzuru Kanemori, Tenri; Kiyoshi Nakazawa, Fujiidera, all of Japan

[73] Assignee: Sharp Kabushiki Kaisha, Japan

[21] Appl. No.: 946,150

[22] Filed: Sep. 17, 1992

Related U.S. Application Data

[63] Continuation of Ser. No. 545,956, Jul. 2, 1990, abandoned.

[30] Foreign Application Priority Data

| Jul. 5, 1989 | [JP] | Japan | 1-174823 |
| Jul. 5, 1989 | [JP] | Japan | 1-174824 |
| Jul. 5, 1989 | [JP] | Japan | 1-174825 |
| Aug. 11, 1989 | [JP] | Japan | 1-209402 |

[51] Int. Cl.$^5$ .............................. G02F 1/136
[52] U.S. Cl. ........................ 359/59; 359/79; 359/87; 257/347; 257/390
[58] Field of Search ............... 350/333, 332, 334, 336; 340/784; 357/23.7, 45, 4; 359/54, 59, 79, 74, 87

[56] References Cited

U.S. PATENT DOCUMENTS

| 4,778,560 | 10/1988 | Takeda et al. | 350/332 |
| 4,804,953 | 2/1989 | Castleberry | 350/333 |
| 4,821,092 | 4/1989 | Noguchi | 350/23.7 |
| 4,938,567 | 7/1990 | Chartier | 350/333 |
| 4,990,460 | 2/1991 | Moriyama | 357/4 |

FOREIGN PATENT DOCUMENTS

| 0318224 | 5/1989 | European Pat. Off. . | |
| 0100415 | 6/1984 | Japan | 340/784 |
| 0033529 | 2/1989 | Japan | 359/59 |
| 0231024 | 9/1989 | Japan | 359/59 |
| 2008304 | 5/1979 | United Kingdom . | |

OTHER PUBLICATIONS

Proc. 1988 International Display Research Conference IEEE New York 1988, pp. 155-158, US; E. Takeda et al.: "An amorphous Si TFT array with TaOx/SiNx double layered insulator for liquid crystal displays".
SID 88 Digest 1988, pp. 310-313, SID. Los Angeles, US; M. Katayama et al., "High-Resolution Full-Color LCDs Addressed by Double-Layered Gate-Insulator a-Si TFTs"—1988.
Patent Abstracts of Japan vol. 13, No. 212 (P-873) (3560), May 18, 1989; JP-A-0129821 (NEC) Jan. 31, 1989.

Primary Examiner—William L. Sikes
Assistant Examiner—Tai V. Duong
Attorney, Agent, or Firm—Nixon & Vanderhye

[57] ABSTRACT

An active matrix board comprises pixel electrodes (9) that are disposed in a matrix fashion on an insulating substrate (1), scan lines (23) which are disposed in a parallel manner between the individual pixel electrodes (9), addition capacity lines (31), and signal lines (11) which intersect the scan lines (23) and the addition capacity lines (31). Each scan line (23) comprises a lower scan line (2) which is discontinuously disposed and an anodizable upper scan line (3) that covers the lower scan line (2) and is continuously disposed. Similarly, each addition capacity line (31) comprises a lower line (29) which is discontinuously disposed and an anodizable upper line (30) that covers the lower line (29) and is continuously disposed. Should a segment of a lower line (2, 29) be eroded during etching, the discontinuous disposition of other segments of the lower line (2, 29) precludes the other segments from being subject to erosion.

4 Claims, 8 Drawing Sheets

ACTIVE MATRIX BOARD HAVING DOUBLE-LAYER SCAN LINES AND CAPACITY LINES WITH DISCONTINUOUS LOWER SCAN LINES AND LOWER CAPACITY LINES

This is a continuation of application Ser. No. 07/545,956, filed Jul. 2, 1990, now abandoned.

CROSS REFERENCE TO RELATED APPLICATION

This application is related to the commonly assigned copending U.S. patent application of Messrs. Negoto, Katayama, Nakazawa, Kato, Kanemori and Nagayasu Ser. No. 07/857,724 which is a continuation of Ser. No. 07/564,287 filed Aug. 8, 1990 entitled "An Active Matrix Board", now abandoned.

BACKGROUND OF THE INVENTION

1. Field of the Invention

This invention relates to an active matrix board for use in combination with a display medium, such as a liquid crystal display, for construction of a display apparatus.

2. Description of the Prior Art

An active matrix driving technique in which pixel electrodes arranged in a matrix fashion on an insulating substrate are independently driven has been employed in display apparatuses using liquid crystals. More especially, the active matrix driving technique has often been used in large-size display apparatuses having a high-density display function.

For use as a switching element for selectively driving the pixel electrodes there are generally known TFT (thin film transistor) elements, MIM (metal-insulating layer-metal) elements, MOS transistor elements, diodes, varistors, and the like. The active matrix driving technique permits high-contrast display and has already been actually incorporated in liquid-crystal TV sets, word processors, computer terminal display units, etc.

Figure 9:
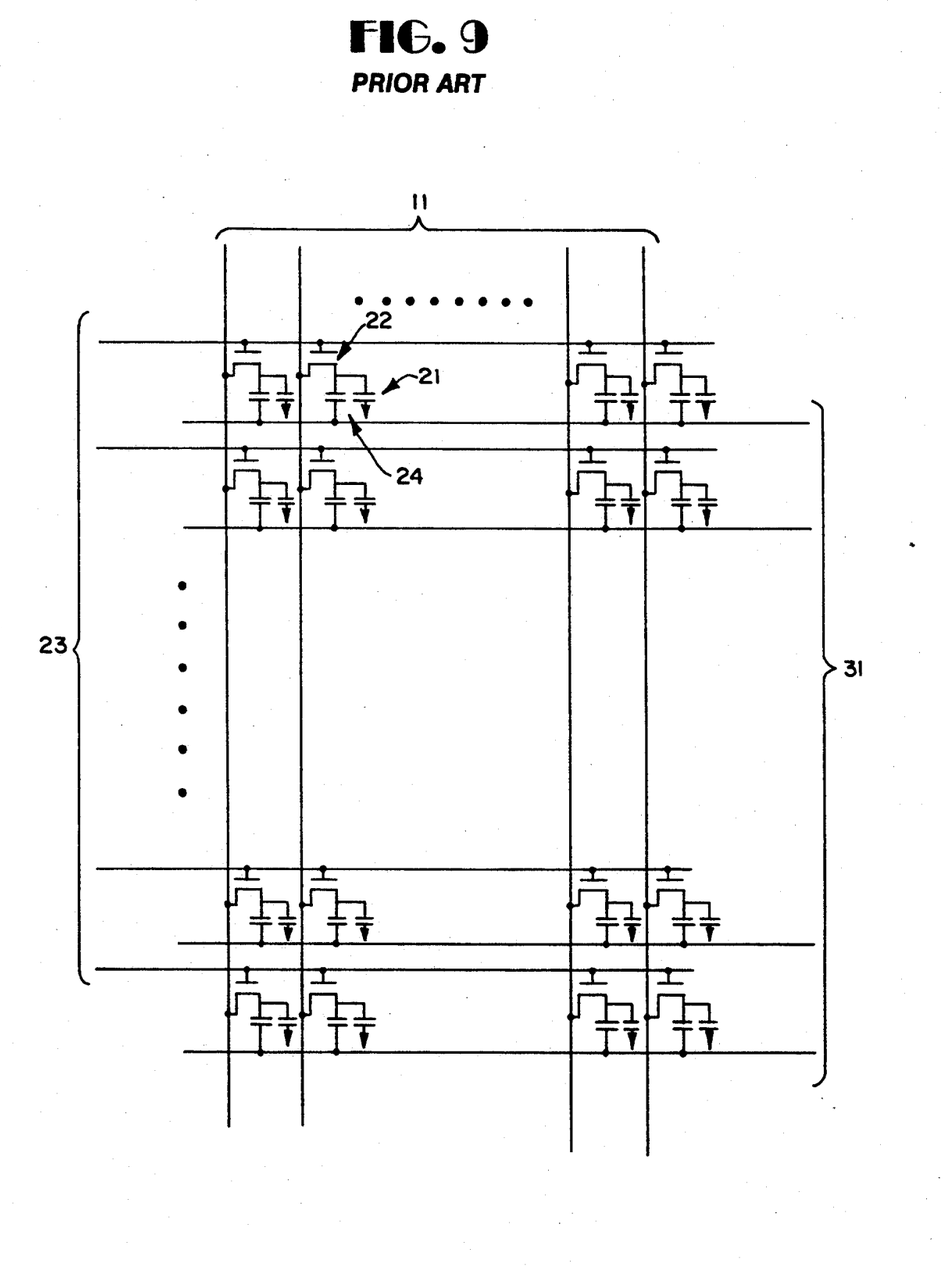
FIG. 9 is a circuit diagram showing a conventional active matrix display apparatus.

A circuit diagram for an active matrix display apparatus in which a TFT is used as a switching element is schematically shown in FIG. 9. A TFT 22 is disposed in the vicinity of each point of intersection between a plurality of parallel gate bus lines 23 acting as scan lines and a plurality of source bus lines 11 intersecting the lines 23 which act as signal lines. A pixel electrode is connected to the TFT 22, and between the pixel electrode and a counter electrode there is formed a picture element 21. An addition capacity 24 is formed between the pixel electrode and an addition capacity electrode.

Figure 10:
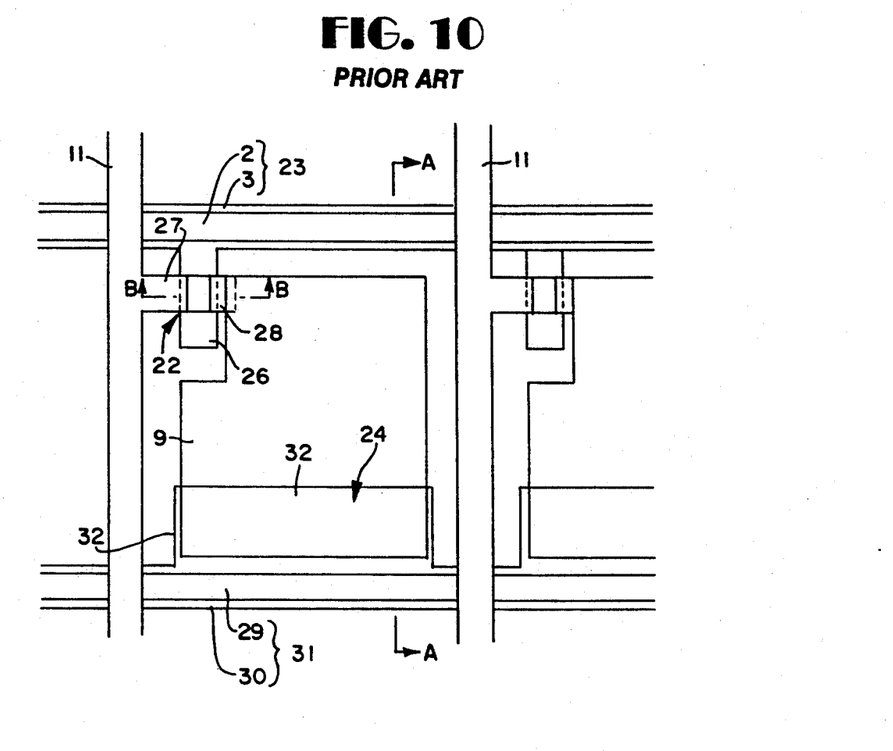
FIG. 10 is a plan view showing a conventional active matrix board.
Figure 11:
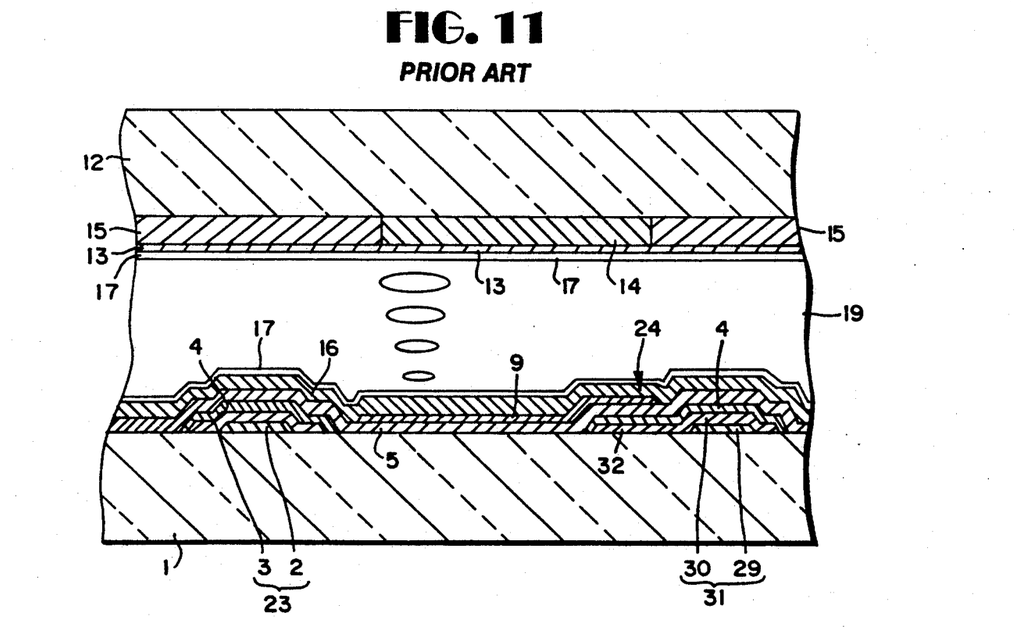
FIG. 11 is a sectional view taken along the line A—A in FIG. 10.
Figure 12:
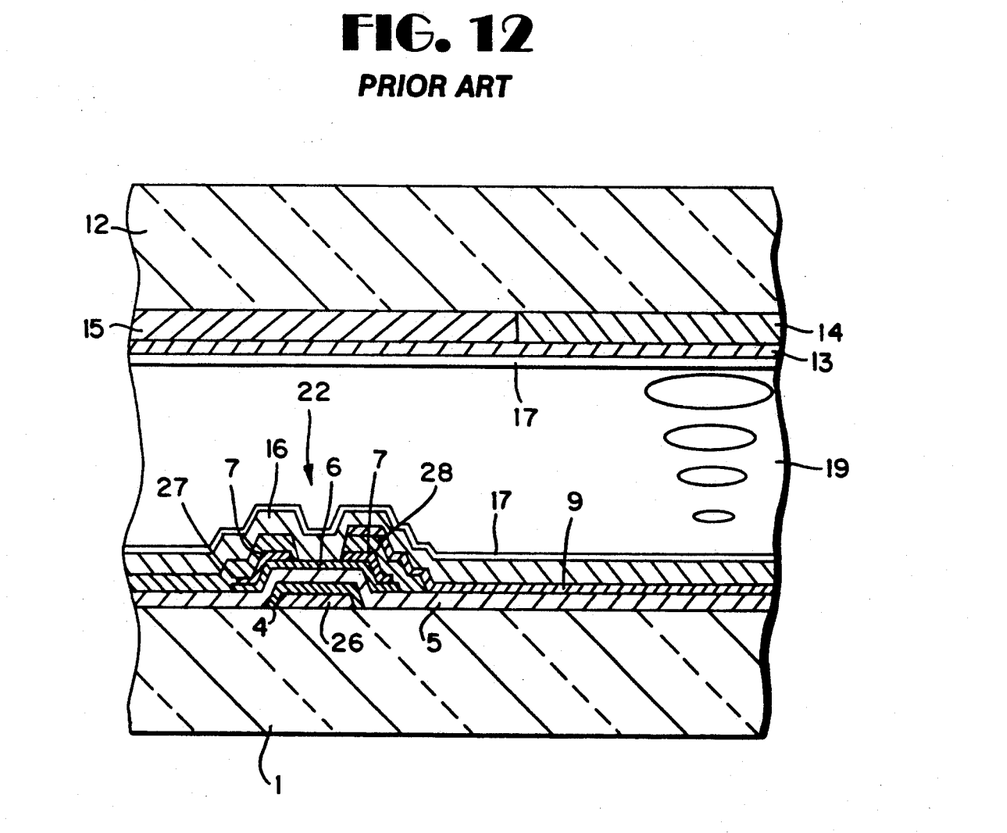
FIG. 12 is a sectional view taken along the line B—B in FIG. 10.

FIG. 10 is a plan view showing a conventional active matrix board and FIGS. 11 and 12 are sectional views showing an active matrix display apparatus taken along lines A—A and B—B in FIG. 10, respectively. Parallel gate bus lines 23 are formed on a glass substrate 1 and, in intersecting relation with the lines 23, there are formed source bus lines 11. A gate insulation film 5 (FIG. 11) which will be described hereinafter is sandwiched between each gate bus line 23 and each source bus line 11.

A TFT 22 as a switching element is disposed adjacent each point of intersection between each gate bus line 23 and a source bus line 11. A gate electrode 26 of the TFT 22 is connected to the gate bus line 23, and a source electrode 27 of the TFT 22 is connected to the source bus line 11. A drain electrode 28 of the TFT 22 is connected to a pixel electrode 9.

An addition capacity line 31 is arranged in parallel to the gate bus line 23 and along a side of the pixel electrode 9 which is opposite to its side nearer to the gate bus line 23. An addition capacity electrode 32 is connected to the addition capacity line 31, the electrode 32 being opposed to the pixel electrode 9 so as to sandwich a gate insulation film 5 therebetween. An addition capacity 24 is formed between the addition capacity electrode 32 and the pixel electrode 9.

Sectional configurations of the gate bus line 23, addition capacity 24, and addition capacity line 31 will be explained with reference to FIG. 11. The gate bus line 23 consists of two layers, namely, a lower gate bus line 2 (2000 Å thick) and an upper gate bus line 3 (2500 Å thick). Likewise, the addition capacity line 31 consists of two layers, namely, a lower capacity bus line 29 (2000 Å thick) and an upper capacity bus line 30 (2500 Å thick). The lower gate bus line 2 and the lower capacity bus line 29 can be simultaneously pattern-formed. The lower gate bus line 2 and the lower capacity bus line 29 are both formed of a low-resistance metal, such as Mo, Al or the like.

For both the upper gate bus line 3 and the upper capacity bus line 30 Ta metal that can form an anodized film is used. Metals such as Mo, Al, and the like used for formation of the lower gate line 2 and lower capacity bus line 29 are less resistant to corrosion due to the action of fluoric acids or the like used as an etchant in a later process of the formation of TFT 22, and therefore the upper gate line 3 is so formed as to completely cover the lower gate line 2 for protection thereof. Likewise, the upper capacity bus line 30 is so formed as to completely cover the lower capacity bus line 29.

As above stated, both the gate bus line 23 and the addition capacity line 31 are composed of two layers and both the lower gate line 2 and the lower capacity bus line 29 are formed from such metals as Mo, Al or the like, whereby the specific resistance of the lines 23 and 31 can be lowered. Thus, it is possible to solve the problem of signal delay on the lines 23 and 31 which may arise in a larger-sized display apparatus. Moreover, the formation of an anodized layer on the upper surfaces of the lines 23 and 31 can reduce the possibility of a defective isolation occurrence with respect to the lines 23, 31.

The upper capacity bus line 30 is connected, at its portion parallel to one side of the pixel electrode 9, to the addition capacity electrode 32 located below the pixel electrode 9. The upper gate line 3, upper capacity bus line 30, and addition capacity electrode 32 are simultaneously pattern-formed. Therefore, the addition capacity electrode 32 is also formed from Ta.

On the upper gate line 3, upper capacity bus line 30, and addition capacity electrode 32, an anodized film 4 (3000 Å thick) of $Ta_2O_5$ is formed by anodizing their respective upper surfaces. A gate insulating film 5 (3000 Å thick) of $SiN_x$ (silicon nitride) is formed on the entire surface of the substrate to cover the anodized film 4. A pixel electrode 9 (1000 Å thick) made of ITO is formed on the gate insulating film 5. An addition capacity 24 is formed between the pixel electrode 9 and the addition capacity electrode 32 that faces the pixel electrode 9 so as to sandwich the gate insulating film 5 therebetween. Further, a protective film 16 (3000 Å thick) of $SiN_x$ and an orientation film 17 are laid so as to completely cover the substrate, resulting in an active matrix board.

On a glass base 12 placed counter to the substrate 1 are provided a color filter 14 and black stripes 15 and, in addition, formed all over thereon are counter electrodes 13 made of ITO and an orientation film 17, resulting in an active matrix display apparatus.

TFT 22 will be explained according to the process of fabrication, with reference to FIG. 12. Gate electrodes 26 of Ta metal are formed simultaneously with the above mentioned gate lines 3, upper capacity bus lines 30, and addition capacity electrodes 32. The gate electrodes 26 are anodized simultaneously with the lines 3, 30 and electrodes 32, an anodized film 4 being thus formed on the gate electrodes 26. A gate insulating film 5 is formed over the substrate 1 to completely cover the anodized film 4.

Next, an intrinsic semiconductor amorphous silicon (hereinafter referred to as "a-Si(i)") layer (1000 Å thick) is deposited on each gate electrode 26 so as to sandwich a gate insulating film 5 therebetween, the a-Si(i) layer functioning as a semiconductor layer 6. Moreover, on the a-Si(i) layer is deposited an n-type semiconductor amorphous silicon (hereinafter referred to as "a-Si(n+)") layer (500 Å thick) which functions as contact layers 7.

Then, patterning is carried out on the a-Si(i) layer and the a-Si(n+) layer simultaneously to form a semiconductor layer 6 and contact layers 7. At this point of time, there is a portion yet to be removed by etching between the two contact layers 7, and therefore the two contact layers 7 are still connected to each other by that portion.

A Ti metal layer (3000 Å thick) is placed all over the substrate and then patterning is effected on the Ti metal layer to form source electrodes 27 and drain electrodes 28. Simultaneously, the a-Si(n+) layer between the contact layers 7 is removed by etching. Pixel electrodes 9 (1000 Å thick) made of ITO are pattern-formed on the drain electrodes 28 and gate insulating film 5. Further, the aforesaid protective film 16 and orientation film 17 are formed on the entire surface of the substrate.

In the above exemplified process, TFT 22 is formed only after the upper gate lines 3 and upper capacity bus lines 30 of Ta metal, anodized film 4, and gate insulating film 5 are formed on the lower gate lines 2 and lower capacity bus lines 29 of Mo or Al. Despite the fact that in this way three layers of films are formed on the lower gate lines 2 and lower capacity bus lines 29, there may be cases in which lower gate lines 2 and lower capacity bus lines 29 are eroded and become flattened out during the process of TFT 22 fabrication. Such erosion arises from pinholes developed in upper gate lines 3 and upper capacity bus lines 30, anodized film 4, and gate insulating film 5. The Mo or Al metal of which the lower gate lines 2 and lower capacity bus lines 29 are formed is, as already stated, less resistant to the action of a fluoric acid used as an etchant in the process of TFT 22 formation, and therefore the metal is easily eroded if any such pinhole is present therein. Such erosion may occur over a long distance along the length of each gate bus line 23 and each addition capacity line 31. Such erosion leads to troubles, such as increased resistance, line breakdown, and peeling, with respect to the gate bus lines 23 and addition capacity lines 31. Moreover, such erosion also leads to line breakdown, peeling, etc., with respect to the source bus lines 11.

SUMMARY OF THE INVENTION

An active matrix board of this invention, which overcomes the above-discussed and numerous other disadvantages and deficiencies of the prior art, comprises pixel electrodes that are disposed in a matrix fashion on an insulating substrate, scan lines that are disposed in a parallel manner between said individual pixel electrodes, signal lines that intersect said scan lines, and at least one insulating film that covers said scan lines, wherein a protective layer is disposed on said scan lines so as to sandwich said insulating film therebetween.

In one embodiment, the active matrix board further comprises TFTs that have said insulating film functioning as a gate insulating film, said protective layer being made of the same material as a layer present right above said gate insulating film.

In another embodiment, the protective layer comprises a first protective layer that is disposed on said scan lines so as to sandwich said insulating film therebetween, and a second protective layer that is disposed in areas on said first protective layer in which said signal lines do not intersect said scan lines.

In still another embodiment, the active matrix board further comprises TFTs that have said insulating film functioning as a gate insulating film, wherein said first protective layer is made of the same material as a layer present right above said gate insulating film, and said second protective layer is made of the same material as a layer located between the source and drain electrodes of said TFT and a layer present right above said gate insulating film.

In still another embodiment, the protective layer comprises a first protective layer that is disposed on said scan line so as to sandwich said insulating film, a second protective layer that is disposed on said first protective layer, and a third protective layer that is disposed in areas on said second protective layer in which said signal lines do not intersect said scan lines.

In still another embodiment, the active matrix board further comprises TFTs that have said insulating film functioning as a gate insulating film, wherein said first protective layer is made of the same material as a layer present right above said gate insulating film, said second protective layer is made of the same material as a layer centrally present immediately above a layer right above said gate insulating film, and said third protective layer is made of the same material as a layer located between the source and drain electrodes of said TFT and a layer present right above said gate insulating film.

Another active matrix board of this invention comprises pixel electrodes that are disposed in a matrix fashion on an insulating substrate, an addition capacity electrode that faces said pixel electrode, an addition capacity line that is connected to said addition capacity electrode, signal lines that intersect said addition capacity line, and at least one insulating film that covers said addition capacity line, wherein a protective layer is disposed on said addition capacity line so as to sandwich said insulating film therebetween.

In one embodiment, the active matrix board further comprises TFTs that have said insulating film functioning as a gate insulating film, said protective layer being made of the same material as a layer present right above said gate insulating film.

In another embodiment, the protective layer comprises a first protective layer that is disposed on said addition capacity line so as to sandwich said insulating film, and a second protective layer that is disposed in areas on said first protective layer in which said signal lines do not intersect said scan lines.

In still another embodiment, the active matrix board further comprises TFTs that have said insulating film functioning as a gate insulating film, wherein said first protective layer is made of the same material as a layer present right above said gate insulating film, and said second protective layer is made of the same material as a layer located between the source and drain electrodes of said TFT and a layer present right above said gate insulating film.

In still another embodiment, the protective layer comprises a first protective layer that is disposed on said addition capacity line so as to sandwich said insulating film, a second protective layer that is disposed on said first protective layer, and a third protective layer that is disposed in areas on said second protective layer in which said signal lines do not intersect said scan lines.

In still another embodiment, the active matrix board further comprises TFTs that have said insulating film functioning as a gate insulating film, wherein said first protective layer is made of the same material as a layer present right above said gate insulating film, said second protective layer is made of the same material as a layer centrally present immediately above a layer right above said gate insulating film, and said third protective layer is made of the same material as a layer located between the source and drain electrodes of said TFT and a layer present right above said gate insulating film.

Still another active matrix board of this invention comprises pixel electrodes that are disposed in a matrix fashion on an insulating substrate, and scan lines that are disposed in a parallel manner between said individual pixel electrodes, wherein each of said scan lines comprises a lower scan line that is discontinuously disposed and an upper scan line that covers said lower scan line and is continuously disposed.

Still another active matrix board of this invention comprises pixel electrodes that are disposed in a matrix fashion on an insulating substrate, and addition capacity lines that are disposed in a parallel manner between said individual pixel electrodes, wherein each of said addition capacity lines comprises a lower capacity line that is discontinuously disposed and an upper capacity line that covers said lower capacity line and is continuously disposed.

Thus, the invention described herein makes possible the objectives of (1) providing an active matrix board that has scan lines less liable to troubles such as increased resistances, line breakdowns, and peelings in the stage of etching; (2) providing an active matrix board that has addition capacity lines less liable to troubles such as increased resistances, line breakdowns, and peelings; and (3) providing an active matrix board that makes it possible to manufacture display apparatuses at higher yields and thus reduce the cost of manufacturing such apparatuses.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1:
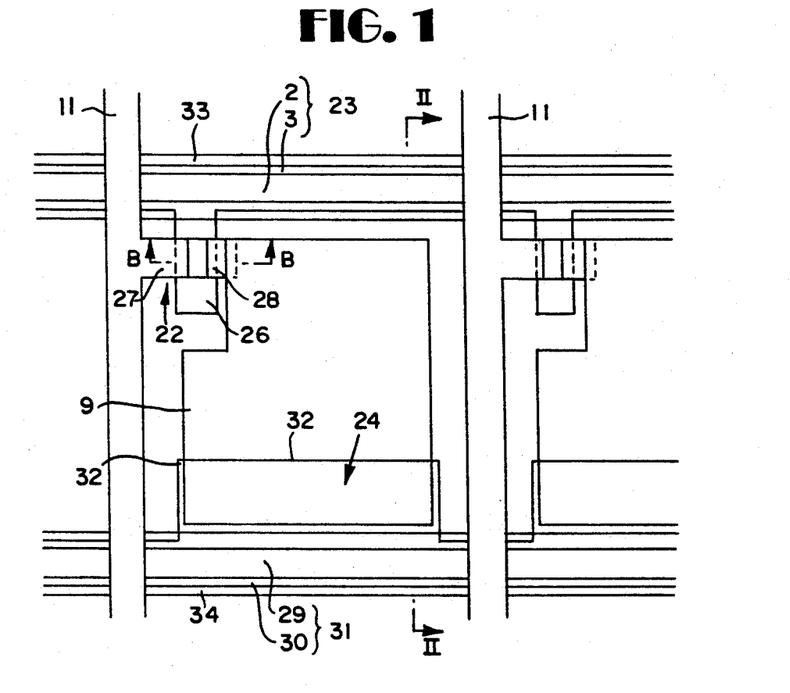
FIG. 1 is a plan view showing an active matrix board of this invention.
Figure 2:
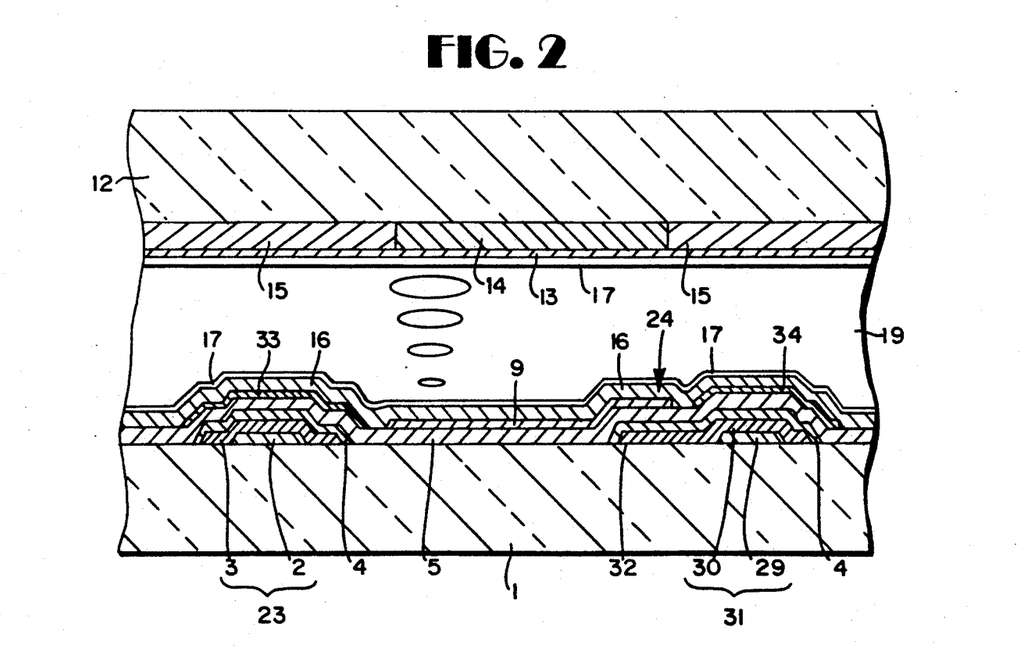
FIG. 2 is a sectional view taken along the line II—II in FIG. 1.

FIG. 1 shows an active matrix board of this invention. FIG. 2 shows a sectional view taken along line II—II in FIG. 1. The sectional view taken along line B—B in FIG. 1 is similar to the view shown in FIG. 12 mentioned in the prior art. Pixel electrodes 9 are arranged in a matrix fashion on a glass base 1 or an insulating substrate, and between the individual pixel electrodes 9 there are formed gate bus lines 23 which function as scan lines. Source bus lines 11 which function as signal lines are arranged in an intersecting relation to the gate bus lines 23. A gate insulating film 5 is placed on the gate bus lines 23 to cover the lines 23, the film 5 being formed over the entire surface of the substrate. The source bus lines 11 are formed on the gate insulating film 5.

A TFT 22 which functions as a switching element is disposed adjacent to each intersecting point between each gate bus line 23 and each source bus line 11. A gate electrode 26 of the TFT 22 is connected to the gate bus line 23, and a source electrode 27 of the TFT 22 is connected to the source bus line 11. A drain electrode 28 of the TFT 22 is connected to a corresponding pixel electrode 9.

An addition capacity line 31 extends along one side of the pixel electrode 9 which is opposite to the other side thereof that is nearer to the gate bus line 23, and in a parallel relation to the gate bus line 23. Connected to the addition capacity line 31 is an addition capacity electrode 32 which is opposed to the pixel electrode 9 so as to sandwich the gate insulating film 5 therebetween. An addition capacity 24 is provided between the addition capacity electrode 32 and the pixel electrode 9.

Sectional configurations of the gate bus line 23, addition capacity 24, addition capacity line 31, and TFT 22 will be explained according to the process of fabrication employed, with reference to FIGS. 2 and 12. A lower gate line 2 (2000 Å thick) and a lower capacity bus line 29 (2000 Å thick) were first formed, and then an upper gate line 3 (2500 Å thick) and an upper capacity bus line 30 (2500 Å thick) were formed. In the present example, each gate bus line 23 consists of two layers, namely, a lower gate line 2 and an upper gate line 3. Likewise, each addition capacity line 31 consists of two layers, namely, a lower capacity bus line 29 and an upper capacity bus line 30. The lower gate line 2 and the lower capacity bus line 29 are pattern-formed simultaneously. For the formation of lower gate lines 2 and lower capacity bus lines 29, a metal of low resistivity, such as Mo, Al or the like, is used. In the present example, Mo was used.

A Ta metal that can form an anodized film is used for upper gate lines 3 and upper capacity bus lines 30. In order to protect the lower gate lines 2, the upper gate lines 3 are so formed as to completely cover the lines 2. Likewise, the upper capacity bus lines 30 are so formed as to completely cover the lower capacity bus lines 29. Gate electrodes 26 and addition capacity electrodes 32 were formed simultaneously with the upper gate lines 3 and upper capacity bus lines 30. Therefore, the gate electrodes 26 and addition capacity electrodes 32 are also formed from Ta.

The upper gate lines 3, gate electrodes 26, upper capacity bus lines 30, and addition capacity electrodes 32 were anodized to form an anodized film 4 (3000 Å thick) of $Ta_2O_5$ thereon. Further, a gate insulating film 5 of $SiN_x$ (3000 Å thick) was formed to completely cover the substrate 1 with the anodized film 4.

Then, an a-Si(i) layer (1000 Å thick) was placed over the gate insulating film 5. The a-Si(i) layer functions as a semiconductor layer 6 for TFTs 22, a protective layer 33 on the gate bus lines 23, and a protective layer 34 on the addition capacity lines 31. Then, an a-Si(n+) layer (500 Å thick) which functions as contact layers 7 was placed over the a-Si(i) layer.

In the present example, as stated above, the gate insulating film 5 for TFTs 22 was used as an insulating film for covering the gate bus lines 23 and addition capacity lines 31, and the protective layers 33 and 34 were formed from the same material as the semiconductor layer 6 that is a layer present immediately above the gate insulating film 5.

Then, the a-Si(i) layer and the a-Si(n+) layer were simultaneously subjected to etching in order to provide a semiconductor layer 6 and contact layers 7. In this case, the a-Si(i) layer and the a-Si(n+) layer were left unremoved with respect to portions thereof in areas in which the above-mentioned semiconductor layer 6 was to be formed, as well as in areas above the gate bus lines 23 and addition capacity lines 31. In this etching process, therefore, an upper gate line 3, an anodized film 4, a gate insulating film 5, a protective layer 33 of a-Si(i), an a-Si(n+) layer, and a resist were present above each lower gate line 2 of Mo. Similarly, an upper capacity bus line 30, an anodized film 4, a gate insulating film 5, a protective layer 34 of a-Si(i), an a-Si(n+) layer, and a resist were present above each lower capacity bus line 29.

Since a number of layers are present one over another in this way, the lower gate line 2 and lower capacity bus line 29, both of Mo metal, cannot easily be corroded even if a pinhole is present in any of these layers.

Next, etching was effected of the a-Si(n+) layer only to carry out patterning for the contact layers 7. By this etching operation were removed the a-Si(n+) layer present above the protective layers 33, 34 and the a-Si(n+) layer present between the contact layers 7 were simultaneously removed.

In this etching stage, the upper gate line 3, anodized film 4, gate insulating film 5 and, in addition, the protective layer 33 for the a-Si(i) layer are present above the lower gate line 2. Likewise, the upper capacity bus line 30, anodized film 4, gate insulating film 5 and, in addition, the protective layer 34 for the a-Si(i) layer are present above the lower capacity bus line 29.

In this etching stage, too, since a number of layers are present one over another in this way, the lower gate line 2 and lower capacity bus line 29 cannot easily be eroded. Such protective effects of the protective layers 33, 34 against the etchant can be recognized in the subsequent etching stage as well.

A Ti metal layer (3000 Å thick) was laid over the entire surface of the substrate, and then the Ti metal layer was subjected to etching. Thus, source electrodes 27, drain electrodes 28, and source bus lines 11 were pattern-formed on the contact layers 7. In this case, the portion between the contact layers 7 is again exposed to the etchant, whereupon all a-Si(n+) layer residue, if any, is completely removed.

Next, pixel electrodes 9 (1000 Å thick) made of ITO were pattern-formed above the drain electrodes 28 and gate insulating film 5. Then, the aforesaid protective layer 16 and orientation film 17 were laid over the substrate 1, and thus the active matrix board of the invention was obtained.

In the foregoing etching stage for Ti metal and ITO layers as well, since protective layers are present, one over another, as above mentioned, the lower gate lines 2 and the lower capacity bus lines 29, both of Mo metal, can be effectively protected from the action of the etchant.

Color filters 14 and black stripes 15 are provided on a glass base 12 disposed opposite to the substrate 1. Further, counter electrodes 13 for ITO and an orientation film 17 are formed all over, and thus an active matrix display apparatus is obtained.

EXAMPLE 2

Figure 3:
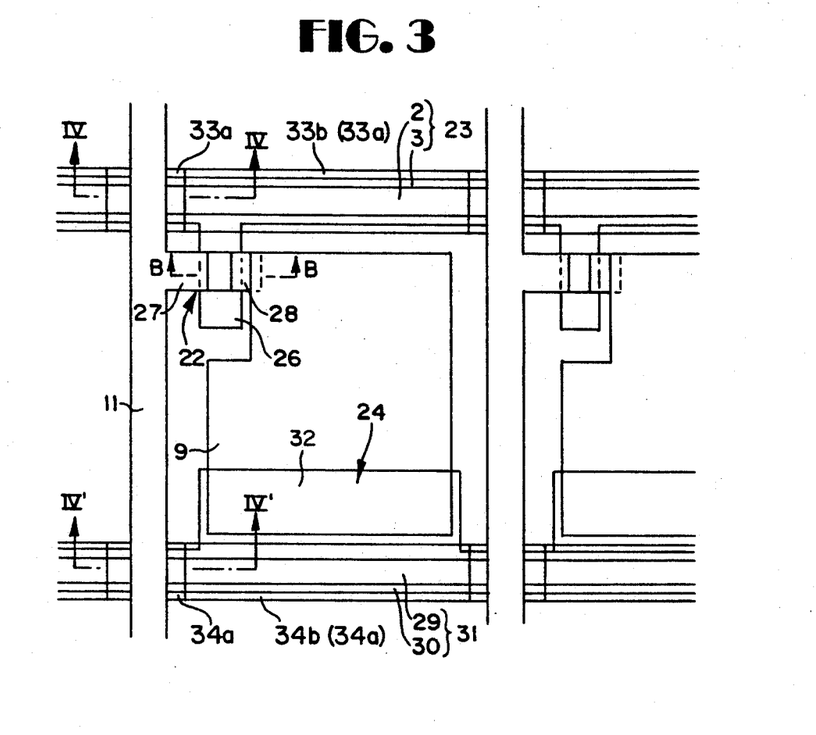
FIG. 3 is a plan view showing another active matrix board of this invention.
Figure 4:
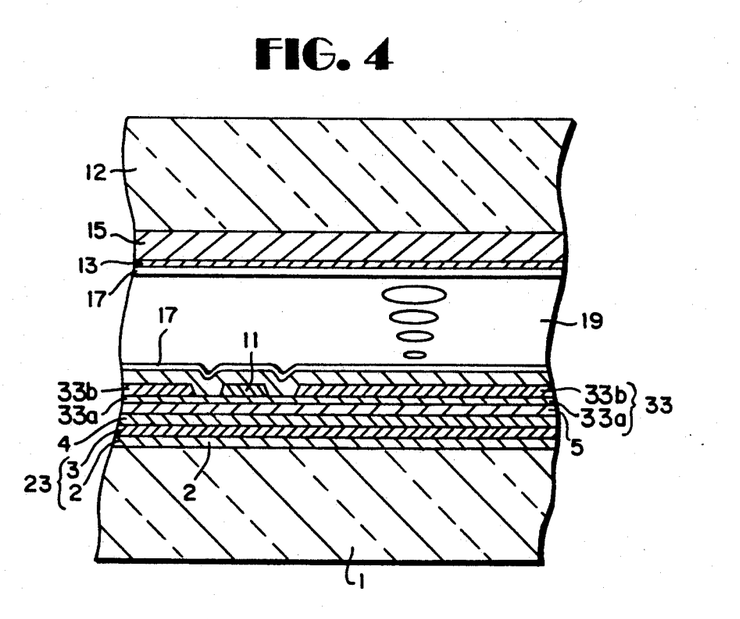
FIG. 4 is a sectional view taken along the line IV—IV in FIG. 3.

FIG. 3 is a plan view showing another active matrix board according to the invention. FIG. 4 shows a sectional configuration of gate bus lines 23 taken along line IV—IV in FIG. 3. The sectional configuration of addition capacity lines 31 taken along line IV'—IV' in FIG. 3 is similar to the sectional configuration shown in FIG. 4. A section taken along line B—B in FIG. 3 is similar to the section shown in FIG. 12 for explanation of the prior art arrangement. The active matrix board of the present example is of the same arrangement as the one shown in Example 1, except that the protective layer 33 consists of a first protective layer 33a and a second protective layer 33b, and that the protective layer 34 consists of a first protective layer 34a and a second protective layer 34b.

Sectional configurations of gate bus lines 23, addition capacity lines 31, and TFTs 22 will be explained according to the process of fabrication, with reference to FIGS. 4 and 12. In the same manner as in the foregoing Example 1, a lower gate line 2 (2000 Å thick) and a lower capacity bus line 29 (2000 Å thick) were first formed, and then an upper gate line 3 (2500 Å thick) and an upper capacity bus line 30 (2500 Å thick) were formed. In the section taken along line IV'—IV' in FIG. 3, a lower capacity bus line 29, an upper capacity bus line 30, and an addition capacity line 31 are placed instead of the lower gate line 2, upper gate line 3, and gate bus line 23 respectively in FIG. 4.

Next, the upper gate line 3, gate electrode 26, upper capacity bus line 30, and addition capacity electrode 32 were anodized and an anodized film 4 of $Ta_2O_5$ (3000 Å thick) was thus formed thereon. Then, a gate insulating film 5 of $SiN_x$ (3000 Å thick) was formed over the substrate 1 to cover the anodized film 4.

Subsequently, an a-Si(i) layer (1000 Å thick) was deposited on the gate insulating film 5. The a-Si(i) layer functions as a semiconductor layer 6 for TFTs 22, a first protective layer 33a on the gate bus line 23, and a first protective layer 34a on the addition capacity line 31. Then, an a-Si(n+) layer (500 Å thick) was placed over the a-Si(i) layer. The a-Si(n+) layer functions as a second protective layer 33b for contact layers 7 and a second protective layer 34b. In the section taken along line IV'—IV' in FIG. 3, the first protective layer 34a and second protective layer 34b are placed instead of the first protective layer 33a and second protective layer 33b respectively in FIG. 4.

In the present example, as stated above, the gate insulating film 5 for TFTs 22 was used as an insulating film for covering the gate bus lines 23 and addition capacity lines 31, and the first protective layers 33a and 34a were formed from the same material as the semiconductor layer 6 that is a layer present immediately above the gate insulating film 5; and the second protective layers 33b and 34b were formed from the same material as the contact layer 7 that is a layer present between the source electrodes 27 and drain electrodes 28 for TFTs 22 and a layer present immediately above the gate insulating film 5 (i.e., the semiconductor layer 6).

Subsequently, the a-Si(i) layer and the a-Si(n+) layer were simultaneously subjected to etching in order to provide a semiconductor layer 6 and contact layers 7. In this case, the a-Si(i) layer and the a-Si(n+) layer were left unremoved with respect to portions thereof in areas in which the above-said semiconductor layer 6 was to be formed, as well as in areas above the gate bus lines 23 and addition capacity lines 31. In this stage of etching, therefore, an upper gate line 3, an anodized film 4, a gate insulating film 5, a first protective layer 33a of a-Si(i), a second protective layer 33b of a-Si(n+), and a resist were present above each lower gate line 2 of Mo metal. Likewise, an upper capacity bus line 30, an anodized film 4, a gate insulating film 5, a first protective layer 34a of a-Si(i), a second protective layer 34b of a-Si(n+), and a resist were present above each lower capacity bus line 29.

Since such numerous layers are present one over another, the lower gate line 2 and lower capacity bus line 29, both of Mo metal, cannot easily be eroded even if a pinhole is present in any of these layers.

Next, etching was effected of the a-Si(n+) layer only to carry out patterning for the contact layers 7. By this etching operation the a-Si(n+) layer present above the first protective layers 33a and 34a over the areas in which the gate bus lines 23 and addition capacity lines 31 intersect the source bus lines 11, and the a-Si(n+) layer present between the contact layers 7, were simultaneously removed.

In this etching stage, the upper gate line 3, anodized film 4, gate insulating film 5 and, in addition, the first protective layer 33a for the a-Si(i) layer are present above the area in which the lower gate line 2 intersect the source bus line 11. Likewise, the upper capacity bus line 30, anodized film 4, gate insulating film 5 and, in addition, the first protective layer 34a for the a-Si(i) layer are present above the area in which the lower capacity bus line 29 intersects the source bus line 11.

The upper gate line 3, anodized film 4, gate insulating film 5, first protective layer 33a for the a-Si(i) layer, second protective layer 33b for the a-Si(n+) layer, and the resist are present, one over another, above the area in which the lower gate line 2 does not intersect the source bus line 11. Likewise, the upper capacity bus line 30, anodized film 4, gate insulating film 5, first protective layer 34a for the a-Si(i) layer, and second protective layer 34b for the a-Si(n+) layer were present, one over another, above the area in which the lower capacity bus line 29 does not intersect the source bus line 11.

In this etching stage, since many layers are present one over another in this way, the lower gate line 2 and the lower capacity bus line 29, both of Mo metal, cannot easily be eroded.

Moreover, the Ti metal layer was etched to pattern-form source electrodes 27, drain electrodes 28, and source bus lines 11, and thereafter pixel electrodes 9 made of ITO were pattern-formed by etching. In this stage of Ti metal and ITO etching, a good protective effect against the action of the etchant was equally observed with respect to both the first and second protective layers 33a, 33b and the first and second protective layers 34a, 34b. The active matrix board shown in this example is obtainable after further stages for fabrication are carried out in the same way as in Example 1.

Example 3

Figure 5:
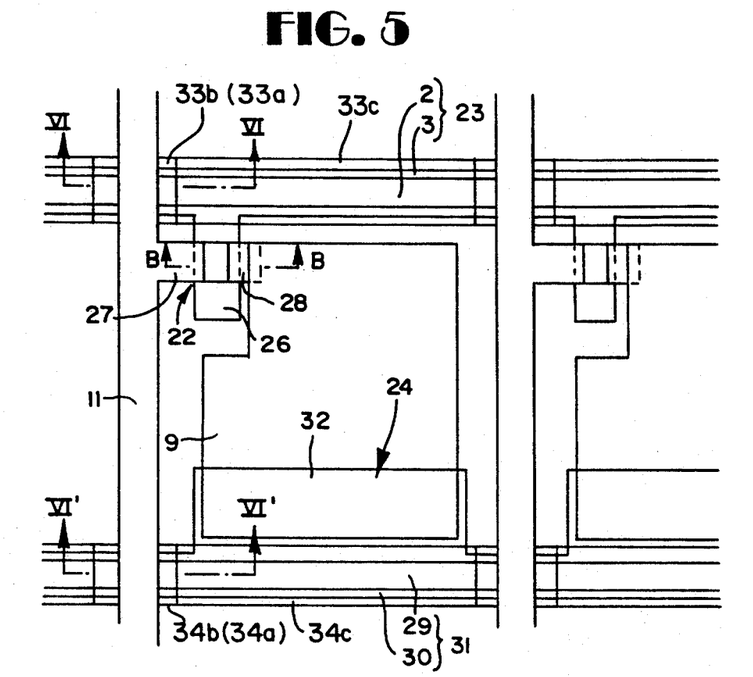
FIG. 5 is a plan view showing still another active matrix board of this invention.
Figure 6A:
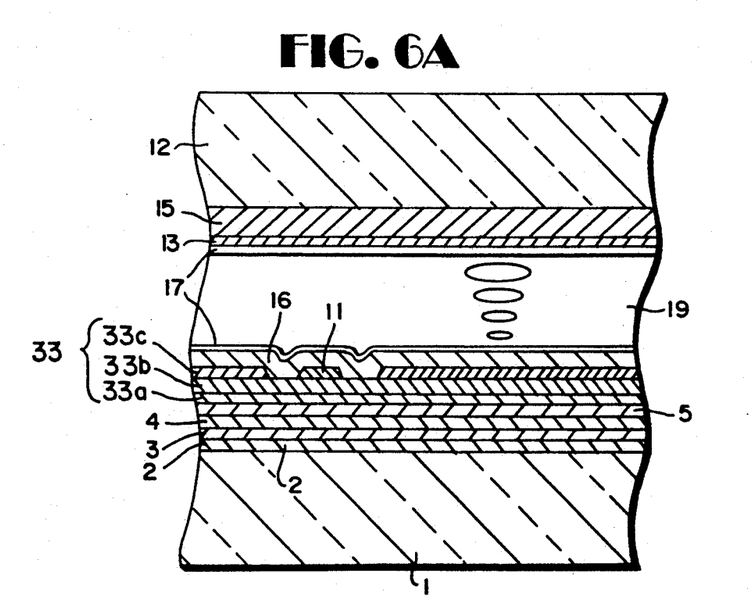
FIG. 6A is a sectional view taken along the line VI—VI in FIG. 5.
Figure 6B:
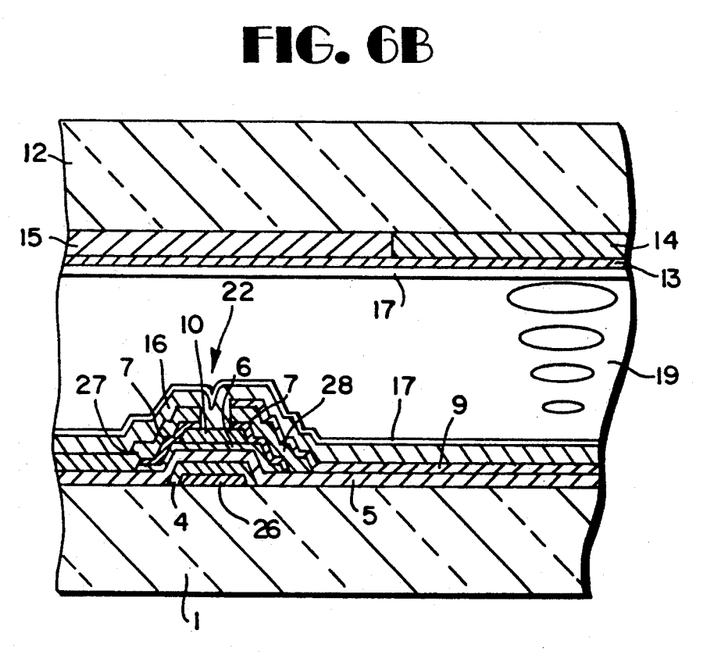
FIG. 6B is a sectional view taken along the line B—B in FIG. 5.

FIG. 5 is a plan view showing still another active matrix board according to the invention. FIG. 6A is a view showing the sectional configuration of a gate bus line 23 taken along the line VI—VI in FIG. 5. The sectional configuration of an addition capacity line 31 taken along the line VI'—VI' in FIG. 5 is similar to the configuration shown in FIG. 6A. FIG. 6B is a view showing the sectional configuration of the TFT 22 taken along the line B—B in FIG. 5. The active matrix board in this example is of the same arrangement as the one shown in Example 1, except that the protective layer 33 consists of a first protective layer 33a, a second protective layer 33b, and a third protective layer 33c, that the protective layer 34 consists of a first protective layer 34a, a second protective layer 34b, and a third protective layer 34c, and that a protective layer 10 for protecting a semiconductor layer 6 that underlies the said protective layer 10 (hereinafter, referred to as a semiconductor layer protective layer 10) is formed.

Sectional configurations of each gate bus line 23, each addition capacity line 31, and each TFT 22 will be explained according to the process of fabrication employed, with reference to FIGS. 6A and 6B. In the same manner as in the above-described Example 2, lower gate lines 2, lower capacity bus lines 29, upper gate lines 3, gate electrodes 26, addition capacity electrodes 32 (FIG. 5), and upper capacity bus lines 30 (FIG. 5) were pattern-formed. Then, an anodized film 4 was formed on the upper gate lines 3, gate electrodes 26, upper capacity bus lines 30, and addition capacity electrodes 32, and a gate insulating film 5 of $SiN_x$ was formed over the substrate 1 to cover the anodized film 4.

Next, an a-Si(i) layer (1000 Å thick) was placed on the gate insulating film 5. The a-Si(i) layer functions as a semiconductor layer 6 for TFTs 22, a first protective layer 33a, and a first protective layer 34a. Subsequently, an $SiN_x$ layer (2000 Å thick) was placed over the a-Si(i) layer. Patterning of the $SiN_x$ layer was carried out to form a semiconductor layer protective layer 10 for TFTs 22, a second protective layer 33b, and a second protective layer 34b. The second protective layers 33b and 34b were formed so as to cover the gate bus lines 23 and the addition capacity lines 31 respectively. Then, an a-Si(n+) layer (500 Å thick) was placed over the substrate 1 to cover the semiconductor layer protective layer 10, second protective layer 33b, and second protective layer 34b. The a-Si(n+) layer functions as contact layers 7, a third protective layer 33c, and a third protective layer 34c. In the section taken along the line VI'—VI' in FIG. 5, the first protective layer 34a, second protective layer 34b, and third protective layer 34c are placed instead of the first protective layer 33a, second protective layer 33b, and third protective layer 33c respectively in FIG. 6A.

In the present example, as above stated, the gate insulating film 5 for TFTs 22 was utilized as an insulating film for covering the gate bus lines 23 and addition capacity lines 31, and the first protective layers 33a and 34a were formed from the same material as the semiconductor layer 6, present immediately above the gate insulating film 5. The second protective layers 33b and 34b were formed from the same material as the semiconductor layer protective layer 10, a layer centrally present immediately above a layer right above the gate insulating film 5. The third protective layers 33c and 34c were formed from the same material as the one contact layer 7 located between the source electrodes 27 and drain electrodes 28 for TFTs 22 and the semiconductor layer 6 that is present immediately above the gate insulating film 5.

Next, the a-Si(i) layer and the a-Si(n+) layer were subjected to etching simultaneously in order to form a semiconductor layer 6 and contact layers 7. In this case, the a-Si(i) layer and the a-Si(n+) layer were left unremoved with respect to their portions in areas in which a semiconductor layer 6 was to be formed and also in areas above the gate bus lines 23 and addition capacity lines 31. In this etching stage, therefore, an upper gate line 3, an anodized film 4, a gate insulating film 5, a first protective layer 33a of a-Si(i), a second protective layer 33b of SiN$_x$, a third protective layer 33c of a-Si(n+), and a resist are present above each lower gate line 2 of Mo metal. Similarly, an upper capacity bus line 30, an anodized film 4, a gate insulating film 5, a first protective layer 34a of a-Si(i), a second protective layer 34b of SiN$_x$, a third protective layer 34c of a-Si(n+), and a resist are present above each lower capacity bus line 29. Since such numerous layers are present one over another, the lower gate line 2 and lower capacity bus line 29, each of Mo metal, cannot easily be eroded even if pinholes are present in any of these layers.

Next, etching was effected of the a-Si(n+) layer only to carry out patterning for the contact layers 7. By this etching operation the a-Si(n+) layer in the area in which the gate bus line 23 and addition capacity line 31 intersect the source bus line 11, and the a-Si(n+) layer present between the contact layers 7 were simultaneously removed.

In this stage of etching, an upper gate line 3, an anodized film 4, a gate insulating film 5 and, in addition, a first protective layer 33a of a-Si(i) and a second protective layer 33b of SiN$_x$ are present one over another above the area in which each lower gate line 2 intersects a source bus line 11. Similarly, an upper capacity bus line 30, an anodized film 4, a gate insulating film 5 and, in addition, a first protective layer 34a of a-Si(i) and a second protective layer 34b of SiN$_x$ are present one over another above the area in which each lower capacity bus line 29 intersects a source bus line 11.

An upper gate line 3, an anodized layer 4, a gate insulating film 5, a first protective layer 33a of a-Si(i), a second protective layer 33b of SiN$_x$, a third protective layer 33c of a-Si(n+), and a resist are present, one over another, above the area in which each lower gate line 2 does not intersect a source bus line 11. Similarly, an upper capacity bus line 30, an anodized layer 4, a gate insulating film 5, a first protective layer 34a of a-Si(i), a second protective layer 34b of SiN$_x$, a third protective layer 34c of a-Si(n+), and a resist are present, one over another, above the area in which each capacity bus line 29 does not intersect a source bus line 11.

In this etching stage, too, since such numerous layers are present one over another, the lower gate line 2 and lower capacity bus line 29, both of Mo metal, cannot easily be eroded.

Source electrodes 27, drain electrodes 28, and source bus lines 11 were pattern-formed by subjecting the Ti metal layer to an etching treatment, and then pixel electrodes 9 of ITO were pattern-formed by etching. In this stage of Ti metal and ITO etching, a good protective effect against the etchant was observed with respect to the first to third protective layers 33a, 33b, 33c and the first to third protective layers 34a, 34b, 34c as well. The active matrix board shown in this example is obtainable after further steps as described in the foregoing Example 1.

In the active matrix board shown in each of the foregoing Examples 1 through 3, the gate bus lines and the addition capacity lines are of a two-layer construction. However, the invention is also applicable to boards having gate bus lines or addition capacity lines of a single layer construction.

Example 4

Figure 7:
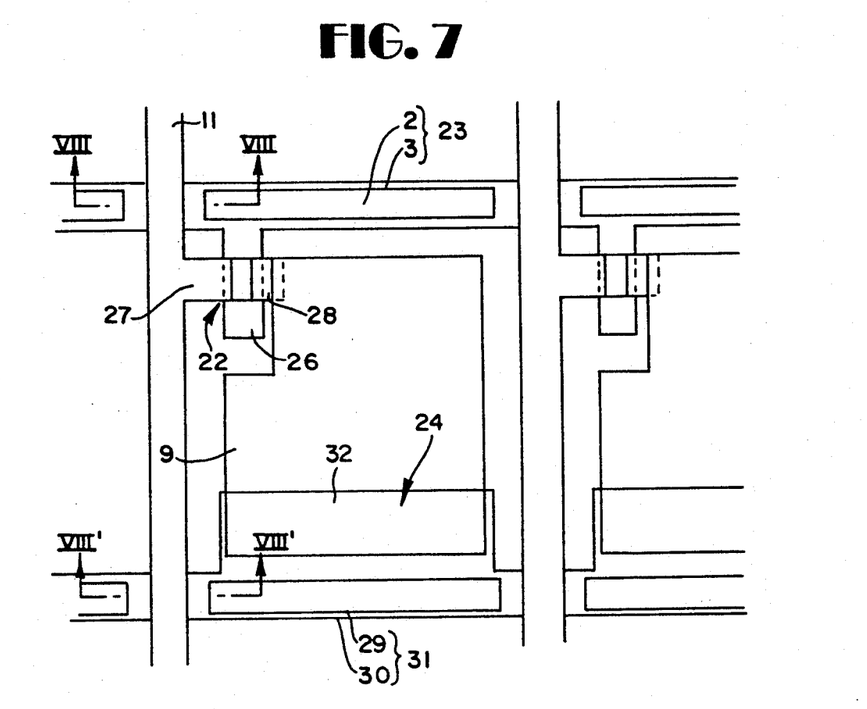
FIG. 7 is a plan view showing still another active matrix board of this invention.
Figure 8:
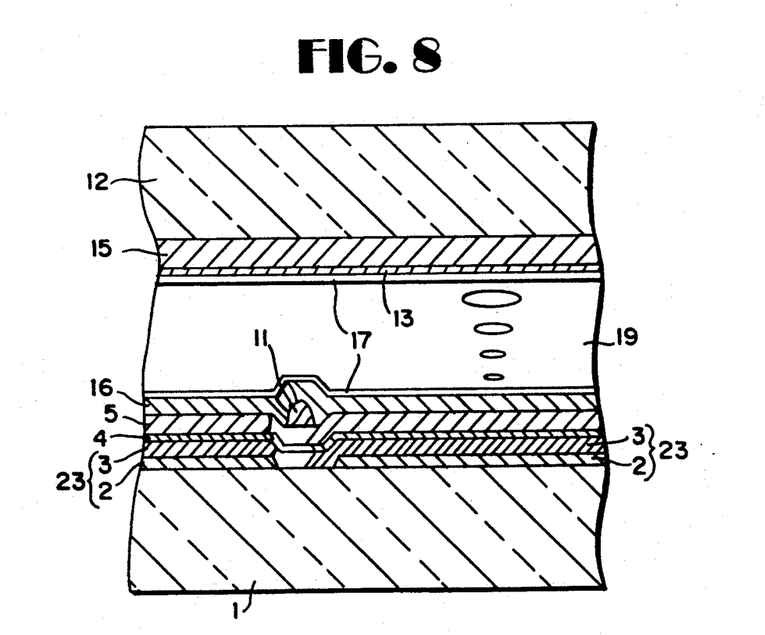
FIG. 8 is a sectional view taken along the line VIII—VIII in FIG. 7.

FIG. 7 is a plan view showing still another active matrix board according to the invention. FIG. 8 shows a sectional configuration of a gate bus line 23 taken along the line VIII—VIII in FIG. 7. The sectional configuration of an addition capacity line 31 taken along the line VIII'—VIII' in FIG. 7 is similar to that shown in FIG. 8. The arrangement of the active matrix board of the present example as viewed in plan is the same as that described with respect to Example 1, except for the areas in which the gate bus lines 23 and addition capacity lines 31 are formed.

Sectional configurations of each gate bus line 23 and each addition capacity line 31 in this example will be explained with reference to FIG. 8. Lower gate lines 2 (2000 Å thick) and lower capacity bus lines 29 (2000 Å thick) were formed on a glass substrate 1. These lines 2 and 29 are not formed in areas in which source bus lines 11 are to intersect the lines 2 and 29, and they are discontinuously formed. An upper gate line 3 (2500 Å thick) and an upper capacity bus line 30 (2500 Å thick) were formed over each lower gate line 2 and each lower capacity bus line 29 respectively. The two lines 3 and 30 cover the lower gate line 2 and the lower capacity bus line 29 respectively, and they are continuously formed. Therefore, each gate bus line 23 consists of two layers, namely, lower gate line 2 and upper gate line 3. Similarly, each addition capacity line 31 consists of two layers, namely, lower capacity bus line 29 and upper capacity bus line 30. In the section taken along the line VIII'—VIII' in FIG. 7, a lower capacity bus line 29, an upper capacity bus line 30, and an addition capacity line 31 are placed instead of the lower gate line 2, upper gate line 3, and gate bus line 23 respectively in FIG. 8. The lower gate line 2 and the lower capacity bus line 29 are simultaneously pattern-formed. Likewise, the upper gate line 3 and the upper capacity bus line 30 are simultaneously pattern-formed.

For the lower gate line 2 and lower capacity bus line 29, metals of low resistivity, such as Mo, Al and the like, are used in order to reduce the resistivity of the gate line 23 and addition capacity line 31. In the present example, Mo was used. By reducing the resistivity of the gate line 23 and of the addition capacity line 31, it is possible to inhibit the occurrence of signal delay which has often been noticed with large-size display units.

A Ta metal that can form an anodized film is used for both the upper gate line 3 and the upper capacity bus line 30. The upper gate line 3 is so formed as to completely cover the lower gate line 2 for protection of the latter. Likewise, the upper capacity bus line 30 is so formed as to completely cover the lower capacity bus line 29 for protection of the latter. A gate electrode 26 for TFT 22 and an addition capacity electrode 32 were formed simultaneously with the upper gate line 3 and upper capacity bus line 30. Therefore, both the gate electrode 26 and the addition capacity electrode 32 are also formed of Ta.

Next, anodization was carried out on the upper gate line 3, gate electrode 26 for the TFT 22, upper capacity bus line 30, and addition capacity electrode 32 simultaneously to form an anodized film 4 (3000 Å thick) of $Ta_2O_5$ thereon. A gate insulating film 5 of $SiN_x$ (3000 Å thick) was formed over the substrate 1 to cover the anodized film 4.

A source bus line 11 was formed on the gate insulating film 5 in an intersecting relation with the gate bus line 23 and the addition capacity line 31. The source bus line 11 is made of a Ti metal layer (3000 Å thick). The aforesaid protective film 16 and orientation film 17 were placed over the substrate 1. Thus, the active matrix board of the present example was obtained.

Color filters 14 (FIG. 12) and black stripes 15 are provided on a glass base 12 opposed to the substrate 1. Further, counter electrodes 13 of ITO and an orientation film 17 are formed continuously on the base 12, resulting in an active matrix display apparatus.

In this example, as FIG. 8 shows, lower gate lines 2 and lower capacity bus lines 29 are discontinuously formed in areas in which they do not intersect source bus lines 11. If any pinhole or the like is present in any upper gate line 3 or upper capacity bus line 29, and/or in the anodized film 4 and gate insulating film 5, the lower gate line 2 or lower capacity bus line 29 will, in a subsequent stage, for example, in the TFT 22 forming or the like stage, be eroded by the action of the etchant used in pattern forming. However, in this example, each lower gate line 2 and each lower capacity bus line 29 are discontinuously formed; therefore, only one discontinuously formed segment of the lower gate line 2 or lower capacity bus line 29 that is located below the pinhole is eroded, no other portion of the lower gate line 2 or lower capacity bus line 29 being subjected to erosion. Therefore, the gate line 23 or addition capacity line 31 is not liable to increased resistivity, nor does any problem of signal delay occur even where a large display apparatus is employed.

In the present example, each lower gate line 2 and each lower capacity bus line 29 are so formed that they are discontinuous at sites at which they intersect source bus lines 11, but it may be so arranged that they are discontinuous in other portions.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix board comprising:
   a plurality of pixel electrodes disposed in a matrix fashion on an insulating substrate;
   a plurality of lower scan lines disposed on the insulating substrate in a parallel manner between the pixel electrodes, each lower scan line being formed from a low resistivity material and comprising a plurality of discontinuous segments, each segment corresponding to each pixel electrode;
   a plurality of upper scan lines disposed continuously over the lower scan lines, each upper scan line being formed from an anodizable metal and having a width wider than that of the lower scan line;
   a plurality of lower addition capacity lines disposed on the insulating substrate in a parallel manner between the pixel electrodes, each lower addition capacity line being formed from a lower resistivity material and comprising a plurality of discontinuous segments, each segment corresponding to each pixel electrode;
   a plurality of upper addition capacity lines disposed continuously over the lower addition capacity lines, each upper addition capacity line being formed from an anodizable metal and having a width wider than that of the lower addition capacity line;
   a plurality of anodized films formed by the anodization of the upper scan lines and the upper addition capacity lines;
   an insulating layer disposed over the anodized films; and
   a plurality of source lines disposed in a parallel manner so as to be perpendicular to the lower scan lines and the lower addition capacity lines, each source line being formed over the anodized film such that the discontinuity of the lower scan lines and lower addition capacity lines can prevent the upper lines from a breakdown caused by erosion spreading.

2. An active matrix board according to claim 1, wherein each of said lower addition capacity lines and each of lower scan lines are made of same material having a low resistivity such as Mo and Al.

3. A method of forming an active matrix board, the method comprising:
   forming a plurality of parallel lower scan lines on an insulating substrate, each lower scan line being formed from a low resistivity material and comprising a plurality of discontinuously disposed segments;
   forming a plurality of parallel lower addition capacity lines on the insulating substrate, the lower addition capacity lines being parallel to the lower scan lines, each lower addition capacity line being formed from a low resistivity material and comprising a plurality of discontinuously disposed segments;
   using an anodizable metal to form an upper scan line which is continuously disposed over the lower scan line;

using an anodizable metal to form an upper addition capacity line which is continuously disposed over the lower addition capacity line;

anodizing the upper scan line and the upper addition capacity line to form an anodized film thereover;

providing an insulating layer over the anodized film; and forming a source line over the anodized film, the source line being perpendicular to the lower scan line and the lower addition capacity line, the source line being formed over the anodized film has been inserted, whereby an erosion from spreading during etching is prevented because of the discontinuity of the lower scan lines and lower addition capacity lines.

4. The method of claim 3, wherein the upper scan line and the upper addition capacity line are formed from a Ta metal.

* * * * *